(12) United States Patent
Scharfe-Scherf

(10) Patent No.: US 12,071,166 B2
(45) Date of Patent: Aug. 27, 2024

(54) METHOD FOR TRANSFERRING A MOTOR VEHICLE FROM AN AUTONOMOUS INTO A MANUAL DRIVING MODE, TAKING A COGNITIVE MODEL OF THE DRIVER INTO CONSIDERATION

(71) Applicant: Robert Bosch GmbH, Stuttgart (DE)

(72) Inventor: Marlene Susanne Lisa Scharfe-Scherf, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 124 days.

(21) Appl. No.: 17/378,076

(22) Filed: Jul. 16, 2021

(65) Prior Publication Data

US 2022/0024489 A1    Jan. 27, 2022

(30) Foreign Application Priority Data

Jul. 21, 2020    (DE) .......................... 102020209099.8

(51) Int. Cl.
*B60W 60/00* (2020.01)
*B60W 40/04* (2006.01)
*B60W 40/08* (2012.01)

(52) U.S. Cl.
CPC ........ *B60W 60/0053* (2020.02); *B60W 40/04* (2013.01); *B60W 40/08* (2013.01); *B60W 60/0057* (2020.02); *B60W 2040/0863* (2013.01); *B60W 2540/229* (2020.02)

(58) Field of Classification Search
None
See application file for complete search history.

(56) References Cited

U.S. PATENT DOCUMENTS

| 2014/0253722 | A1* | 9/2014 | Smyth | B60W 40/072 348/135 |
| 2018/0088574 | A1* | 3/2018 | Latotzki | G05D 1/0251 |
| 2018/0297592 | A1* | 10/2018 | Kim | G06V 20/584 |
| 2019/0232931 | A1* | 8/2019 | Heckmann | B60W 50/10 |
| 2020/0231182 | A1* | 7/2020 | Oba | B60W 40/09 |

(Continued)

FOREIGN PATENT DOCUMENTS

WO    WO-2018072911 A1 *    4/2018    ............ B60W 10/18

OTHER PUBLICATIONS

Eisele et al, Method and Device for Supporting a Driver in Deactivating a Highly Automated Driving Mode of a Vehicle (English Translation of WO 2018072911 A1), all (Year: 2018).*

(Continued)

*Primary Examiner* — James J Lee
*Assistant Examiner* — Andrew Sang Kim
(74) *Attorney, Agent, or Firm* — NORTON ROSE FULBRIGHT US LLP; Gerard A. Messina

(57) ABSTRACT

A method for transferring a motor vehicle from an autonomous driving mode, in which the motor vehicle is guided autonomously, into a manual driving mode, in which the motor vehicle is guided by a vehicle driver. In the method, pieces of information for supporting the transfer are ascertained with the aid of a cognitive model of the vehicle driver, the cognitive model describing at least one perception process of the vehicle driver with respect to a driving situation and at least one decision-making process of the driver with respect to an action option. A device configured for executing the method is also described.

10 Claims, 6 Drawing Sheets

(56) References Cited

U.S. PATENT DOCUMENTS

| | | | |
|---|---|---|---|
| 2021/0370984 A1* | 12/2021 | Alibeiginabi | B60W 50/0098 |
| 2022/0009524 A1* | 1/2022 | Oba | B60W 60/0061 |
| 2022/0258771 A1* | 8/2022 | Chung | B60W 40/08 |
| 2023/0054024 A1* | 2/2023 | Oba | A61B 3/113 |

OTHER PUBLICATIONS

Salvucci, D.D. Modeling Driver Behavior in a Cognitive Architecture. Human Factors, vol. 48 No. 2, pp. 362-380, 2006. (Year: 2006).*

Vehicle Blind Spot, May 10, 2020, Wikipedia, all. (Year: 2020).*

* cited by examiner

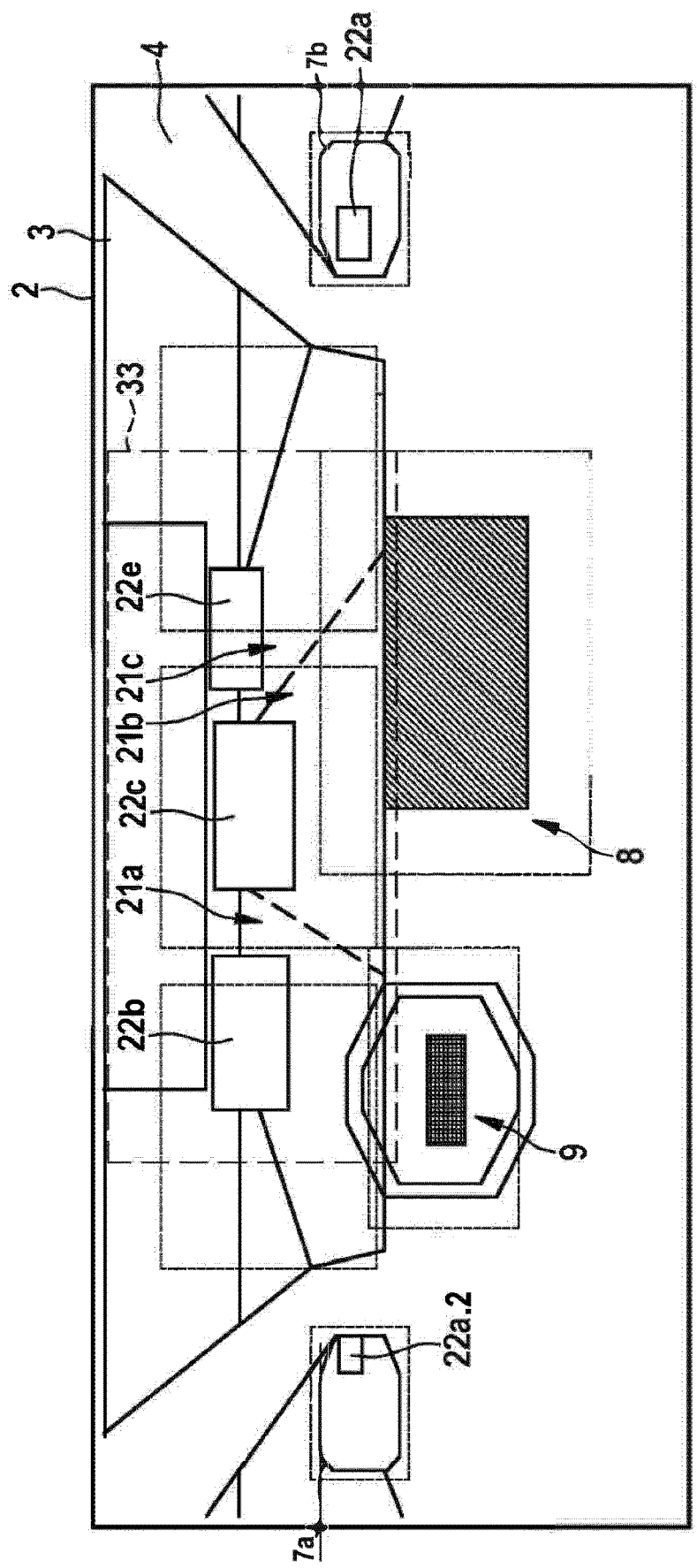

METHOD FOR TRANSFERRING A MOTOR VEHICLE FROM AN AUTONOMOUS INTO A MANUAL DRIVING MODE, TAKING A COGNITIVE MODEL OF THE DRIVER INTO CONSIDERATION

CROSS REFERENCE

The present application claims the benefit under 35 U.S.C. § 119 of German Patent Application No. DE 102020209099.8 filed on Jul. 21, 2020, which is expressly incorporated herein by reference in its entirety.

The present invention relates to a method for transferring a motor vehicle from an autonomous driving mode, in which the motor vehicle is guided autonomously, into a manual driving mode, in which the motor vehicle is guided by a vehicle driver. In the method, pieces of information for supporting the transfer are ascertained with the aid of a cognitive model of the vehicle driver, the cognitive model describing at least one perception process of the vehicle driver with respect to a driving situation and at least one decision-making process of the driver with respect to an action option. Furthermore, a device configured for executing the method is provided.

BACKGROUND INFORMATION

In the related art, take-over requests may be used for transferring a motor vehicle from an autonomous driving mode into a manual driving mode, which prompt the driver according to predefined conditions to take over within a defined time period.

SUMMARY

In accordance with an example embodiment of the present invention, a method according to the present invention advantageously allows an optimization of the safety during the transfer of the motor vehicle from the autonomous into the manual driving mode, by taking situational characteristics into consideration. In this way, a variation of the warning strategy up to an adaptation of the automated driving function during the hand-over may be achieved. According to the present invention, this is made possible by the features disclosed herein. Example embodiments of the present invention are disclosed herein.

In the method according to an example embodiment of the present invention for transferring a motor vehicle from an autonomous driving mode, in which the motor vehicle is guided autonomously, into a manual driving mode, in which the motor vehicle is guided by a vehicle driver, pieces of information for supporting the transfer are ascertained with the aid of a cognitive model of the vehicle driver, the cognitive model describing at least one perception process of the vehicle driver with respect to a driving situation and at least one decision-making process of the vehicle driver with respect to an action option.

This is understood to mean that the method supports an actual take-over of the driving task by the driver, with the aid of a simulation of an information processing process of the driver with respect to a specific driving situation. For this purpose, the method takes pieces of information into consideration which are ascertained with the aid of a cognitive model of the driver. The ascertainment of the pieces of information with the aid of the cognitive model may be designed as a separate method step. The cognitive model of the driver is designed in such a way to enable a mapping and simulation of the perception as well as the check of a decision by the driver. For this purpose, the cognitive model includes at least two areas: a description of the perceptive process of the driver and a description of the recognition and assessment of action options by the driver. In addition, the execution of the action decided on may also be encompassed in the cognitive model.

In accordance with an example embodiment of the present invention, with the aid of the cognitive model, in this way an ascertainment of the time required situationally and individually by the driver may take place, which is needed for enabling an actual take-over of the driving task. Thus, the time is ascertained which the driver in general requires until he or she is able to execute a deliberate and intended action. For this purpose, for example, the time required for perception and decision-making is ascertained. In the process, the time is ascertained which the driver needs to detect the surroundings conditions and traffic situation. Furthermore, the time is ascertained which the driver needs to define the possible driving maneuvers and evaluate the driving maneuvers which are useful in the situation. The time ascertained with the aid of the cognitive model may be used to optimize the hand-over process of the driving function. For example, the estimated required time for the take-over is provided to the assistance system, which executes the automated driving function as well as the hand-over to the driver.

Based on the transmitted pieces of information, the assistance system may adapt the time defined for the take-over. Advantageously, the assistance system may maintain the automated driving mode (i.e., the automated driving function) until the driver, according to the time ascertained for the present driving situation with the aid of the cognitive model, is actually ready for guidance of the motor vehicle. The assistance system may furthermore adapt the warning strategy. In this way, for example, an early warning may positively support a highly distracted driver by enabling the ability to take over the driving function (i.e., the manual driving mode) as quickly as possible. As an alternative or in addition, the assistance system may also adapt the automated driving function so that a more comfortable transition from the automated into the manual driving mode may be made possible. Advantageously, a hand-over, executed step by step, to the driver could take place for this purpose. A visualization of the driving maneuver option assessed as being the best, or an indication of the objects in the driving situation assessed as being important, is also possible for quickly enabling the driver to take over and achieve a safe take-over of the driving function. Within this meaning, the method enables both a support of a transfer and an independent execution of the transfer of the motor vehicle from an automated driving mode into a manual driving mode.

In one advantageous specific embodiment of the present invention, in the method, the cognitive model is designed to comprehensively describe a take-over of the driving function by the vehicle driver.

This is understood to mean that the cognitive model enables a holistic simulation of a driver take-over. This shall be understood to mean that the model describes the cognition in its entirety. This encompasses, in particular, a processing of possible pieces of information. This includes, for example, a perception, an awareness (or a gaining of awareness), the decision (for example including weighing of alternatives), as well as a potential motor activity (or action). Within this meaning, the take-over by the driver must be explicitly distinguished from a hand-over to the driver. The goal is, of course, to correlate the hand-over and the option for the take-over, it being possible both to delay the hand-over and to support, and possibly expedite, the option for the take-over. The perception of the driving situation advantageously relates both to the conditions of the surroundings and to the traffic situation, in particular to the further road users that may be situated ahead of, next to or behind the ego motor vehicle.

Furthermore, in accordance with an example embodiment of the present invention, it is also possible to describe the behavior of the other road users with the aid of a cognitive model. In the process, both their possible action options may be simulated, and times required for carrying out these actions may be ascertained. These pieces of information may be provided to the vehicle driver. As an alternative, these pieces of information may be taken into consideration during the hand-over of the automated driving function to the vehicle driver.

In one possible embodiment of the present invention, in the method, the cognitive model describes a multidimensional decision, in particular, the cognitive model, within the scope of the perception process, describes a multitude of information options and/or within the scope of the decision-making process describes a multitude of action options.

This is understood to mean that the cognitive model is designed to take multidimensional decisions into consideration. Advantageously, multidimensional decisions are also simulated with the aid of the cognitive model, and this result is taken into consideration during the transfer of a motor vehicle into the manual mode. Advantageously, the information options are described in their entirety in a so-called vision module, as it is shown for example in FIG. 3 and FIG. 4. The action options are described in the decision-making process of the cognitive model. These are, for example, a lane change to the right, a keeping of the present lane, a lane change to the left (in particular, in connection with a passing maneuver).

In one preferred embodiment of the present invention, in the method, the cognitive model is based on a cognitive architecture for modeling human information processing structures, in particular, based on an ACT-R architecture.

This is understood to mean that the cognitive model is designed to simulate human control structures. The model is advantageously based on a procedural architecture. Within the scope of the model, a description of the procedure of thinking and acting occurs in so-called productions. Such a production system forms a cognitive information processing model of a cognitive task or of a series of cognitive tasks. Production systems may represent the basis for a multitude of cognitive architectures (for example, Soar, EPIC, CAPS, ACT-R). In the process, the ACT-R architecture has proven to be particularly advantageous for modeling the transfer of the motor vehicle from the automated driving mode into the manual driving mode.

In one alternative refinement of the present invention, in the method, the cognitive model is designed to take different driving situations into consideration.

As explained above, a driving situation may be understood to mean a specific traffic situation, i.e., the presence as well as the position and relation of other road users with respect to the ego motor vehicle. Advantageously, this furthermore subsumes the surroundings conditions which are present in the specific situation, for example the course of a road, number of lanes, etc.

In one advantageous embodiment of the present invention, in the method, the cognitive model, for the definition of a specific driving situation, takes pieces of information into consideration which have an information structure that is adapted to an overall field of vision of the vehicle driver. The ascertainment of the pieces of information may be designed as a separate method step.

In this connection, an overall field of vision is understood to mean a possible visual detection range of the driver, for example including eye movement and possibly head movement. This differs from the present, actual detection range of the driver, the driver field of vision. The description of a specific driving situation takes place with the aid of a mapping of data and pieces of information in a way which corresponds to a possible overall field of vision of a driver. An information structure shall be understood to mean that a piece of information encompasses its actual content (for example vehicle) as well as a spatial assignment (for example, ahead of the ego motor vehicle in the driving direction) as well as possible further information details (for example, at a distance of 25 m).

FIGS. 3 and 4 show an information structure adapted to the overall field of vision of the vehicle driver with respect to two driving situations. The representations there may be designed as a graphical user interface for the cognitive model. Such an implementation may take place with the aid of a so-called vision module. In the process, the corresponding driving situation is drafted virtually in the form of a driving scenario, for example during the product development process of the driver assistance system. The pieces of information created with the aid of the vision module are conducted to the cognitive module in the form of input data and accordingly simulated there. As an alternative to such a static simulation, a dynamic simulation is also possible. In the process, for example, the driving situation present during the actual driving operation is recorded with the aid of sensor systems. These data are processed and dynamically transmitted to the vision module. Thereafter, they are again conducted to the cognitive module as input data and simulated there (essentially in real time). As an alternative or in addition to the described vision module, the information structure may be described purely digitally.

In one possible embodiment of the present invention, the method is characterized in that the information structure adapted to the overall field of vision of the vehicle driver encompasses areas of different cognitive assessments.

The above-described information structure may furthermore also include, for example, relative weightings and/or assessments of the particular information. For example, the areas of interest defined in the overall field of vision may have different relevances. The SEEV (salience, effort, expectancy, value) theory may be used, for example, for defining the particular relevance. The corresponding relevance may be attached to the particular pieces of information.

In one preferred refinement of the present invention, in the method, the information structure adapted to the overall field of vision of the vehicle driver is ascertained, taking sensor data of the vehicle with respect to the present driving situation into consideration.

This is understood to mean that a dynamic simulation occurs with the aid of the cognitive model, taking the instantaneous present driving situation into consideration. As a result, it is not predefined possible scenarios which are simulated in the cognitive model, but the actually present real driving situation is used for this purpose. For example, the data ascertained with the aid of a surroundings sensor of the motor vehicle (in particular, with the aid of the front camera) are used for this purpose and taken into consideration. For example, a coupling of the vision module to the data of the surroundings sensor takes place. This means that the vision module is directly fed the ascertained surroundings data. The cognitive model may advantageously take the data processed by the vision module into consideration for the simulation. Advantageously, even a dynamic adaptation of the cognitive model could take place.

In one alternative specific embodiment of the present invention, in the method, the cognitive model is designed to take driver-specific differences into consideration.

This is understood to mean that the cognitive model may also take individual differences between different drivers into consideration. As an alternative or in addition, the cognitive model may also take situational differences in a driver into consideration, for example different levels of attention as a function of the driver's alertness or readiness that day. Such an adaptation may take place based on stored driver models or analyses of prior manual driving maneuvers. An implementation may take place by taking specific factors, settings of parameter fittings, or also adaptation of, for example, the SEEV assessment for the areas of interest into consideration.

In one possible specific embodiment of the present invention, in the method, the cognitive model, within the scope of the perception process, in a first perception step describes a perception of a take-over request by the vehicle driver, and in a second perception step describes a perception of a driving situation in the driving direction ahead of the motor vehicle by the vehicle driver, and in a third perception step describes a perception of a driving situation in the driving direction to the right with respect to the motor vehicle by the vehicle driver. In one advantageous alternative, a perception of a driving situation in the driving direction to the left with respect to the motor vehicle by the vehicle driver may be described in a perception step.

In one preferred embodiment of the present invention, in the method, the cognitive model describes a driver reaction which occurs directly after a perception of a take-over request.

An immediate actuation of the brake of the motor vehicle by the vehicle driver after perception of the take-over request shall be mentioned as an example of a possible individual reaction of the vehicle driver. Such a reaction may occur spontaneously, for example during panic, without the vehicle driver having achieved a (full) perception of the driving situation. In addition to a brake application, an acceleration or an abrupt lane change may also occur as a reaction.

In an alternative embodiment of the present invention, in the method, the cognitive model describes a summary of the perceived pieces of information prior to the start of the decision-making process.

In this way, it is understood that a summary of the individual perceived aspects is always at the end of the regular perception process. The driver thus subsumes again all gathered pieces of information to then start the decision-making process.

In one advantageous refinement of the present invention, in the method, the cognitive model, within the scope of the decision-making process, in a first decision-making step describes a decision evaluation of the vehicle driver for a lane change to a right lane, and in a second decision-making step describes a decision evaluation of the vehicle driver for keeping a present lane, and in a third decision-making step describes a decision evaluation of the vehicle driver for a lane change to a left lane. This describes a decision-making hierarchy which uses the described order for orientation.

This method may, for example, be implemented in software or hardware or in a mixed form made up of software and hardware, for example in a control unit.

The approach presented here furthermore provides a device which is designed to carry out, activate or implement the steps of one variant of a method described here in appropriate units. The object underlying the present invention may also be achieved quickly and efficiently by this embodiment variant of the present invention in the form of a device.

A device may presently be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, alongside other software modules. Thus, a driver assistance system for executing an autonomous vehicle guidance and/or for handing the vehicle guidance over to the driver thus count as the device. The sensor system for ascertaining the relevant data may also serve as the device. Furthermore, a control unit for the driver assistance system or for the sensor system of the motor vehicle or for the execution of the cognitive model may be regarded as the device.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

BRIEF DESCRIPTION OF THE DRAWINGS

It shall be noted that the features listed individually in the description may be combined with one another in an arbitrary, technically meaningful manner and show further embodiments of the present invention. Further features and the expediency of the present invention are derived from the description of exemplary embodiments based on the figures.

FIG. 4 shows an information structure adapted to the overall field of vision of the vehicle driver with respect to a second driving situation.

DETAILED DESCRIPTION OF EXAMPLE EMBODIMENTS

Figure 1:
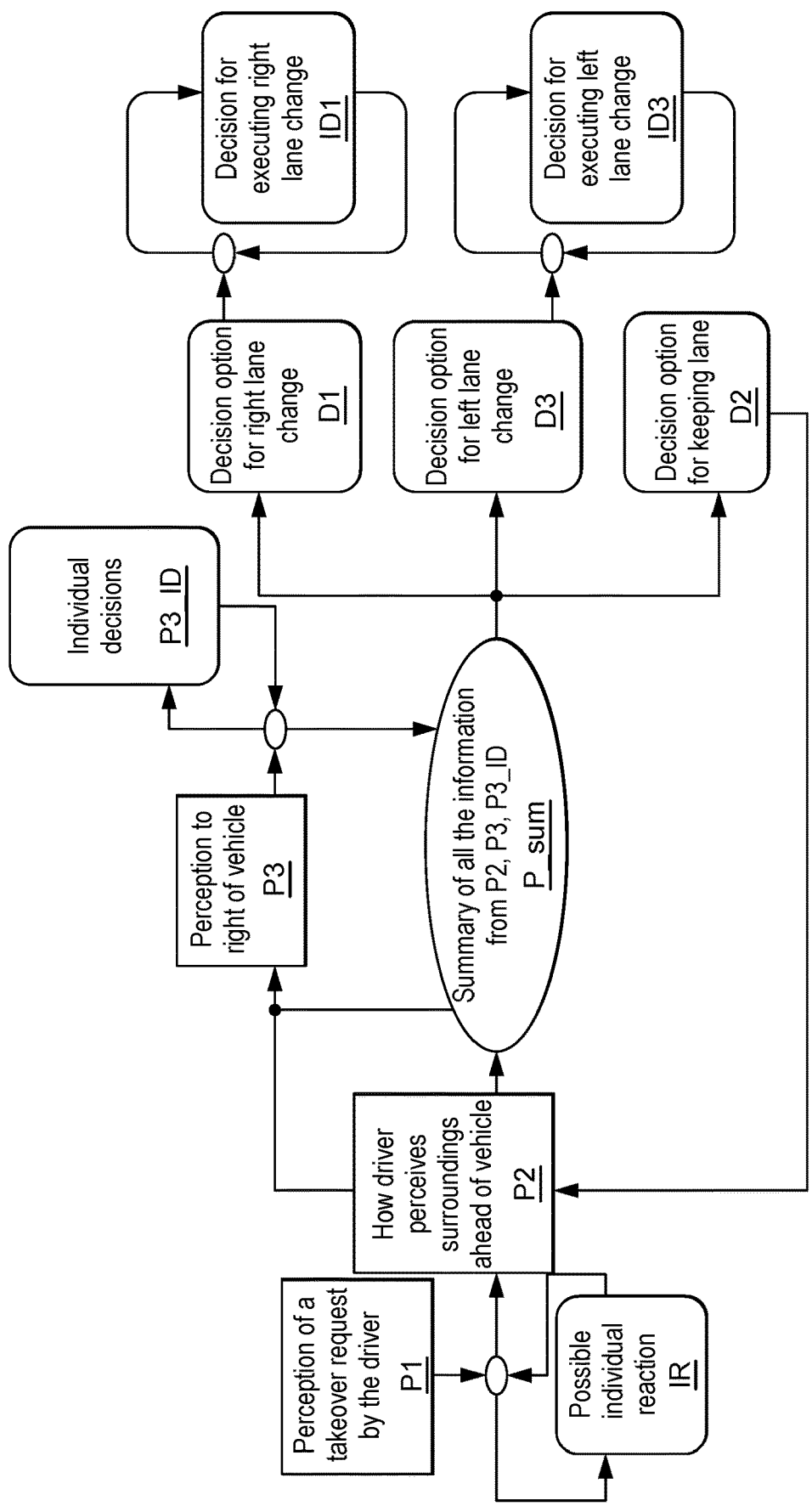
FIG. 1 shows a representation of method steps which are described with the aid of a cognitive model, in accordance with an example embodiment of the present invention.

FIG. 1 shows a representation of method steps which are described with the aid of a cognitive model of a vehicle driver during a take-over of the vehicle guidance from an automated driving mode. The method steps are also referred to as productions. The arrows therebetween illustrate possible step sequences. FIG. 1 describes a rough structure of a cognitive model.

P1 describes the perception of a take-over request by the vehicle driver. IR describes a possible automated individual reaction. An immediate actuation of the brake of the motor vehicle by the vehicle driver shall be mentioned as one example. Such a reaction occurs, for example, promptly in response to the recognized take-over request, without reaching a (full) perception of the driving situation. P2 describes the perception of the driving situation by the vehicle driver spatially ahead of the ego motor vehicle. In particular, conditions of the surroundings as well as the traffic situation may be understood as the driving situation. P3 describes the perception of the driving situation in the driving direction to the right of the ego motor vehicle. The reference to the right vehicle side results from the circumstance that, due to statutory regulations, and the practice associated therewith, the vehicle driver attempts to satisfy the obligation to drive on the right side of the road. For countries with an existing obligation to drive on the left side of the road, the model would accordingly analogously describe the driving situation in the driving direction to the left of the ego motor vehicle with P3. P3 is followed by possible individual decisions with P3_ID. For example, a decision may be made to (additionally) look to the right side window and/or look at the right side mirror and/or to execute a look over the shoulder to the right. P_sum describes a summary of the perceived pieces of information. The perception process may be run through entirely or in parts multiple times. Subsequently to P_sum, a decision-making process begins. D1 describes a decision option for a lane change to the right. In the case of a positive decision in favor of a lane change to the right, ID1 subsequently describes further individual decisions, which support an actual execution of the lane change. Should no positive decision in favor of a lane change to the right have been made, a description of a decision option for keeping the present lane occurs with the aid of D2. If a positive decision in this regard is made, furthermore a perception of the driving situation ahead of the ego motor vehicle takes place with P2. Should no positive decision in favor of keeping the present lane have been made, a description of a decision option for a lane change to the left takes place with the aid of D3. In the case of a positive decision in favor of a lane change to the left, ID3 subsequently describes further individual decisions, which support an actual execution of the lane change.

Figure 2:
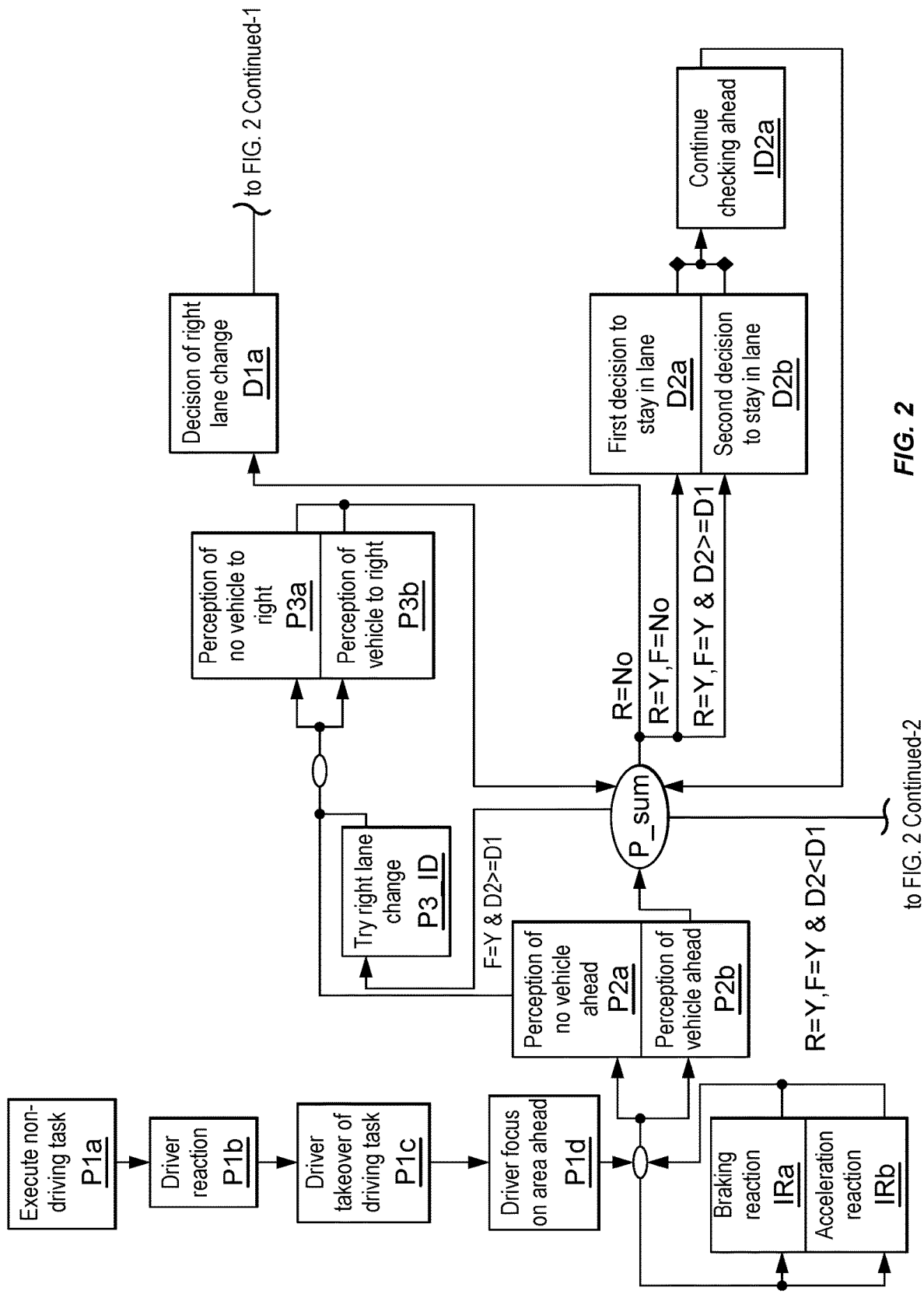
FIG. 2 shows a further representation of method steps, in accordance with an example embodiment of the present invention, which are described with the aid of a cognitive model.
Figure 2:
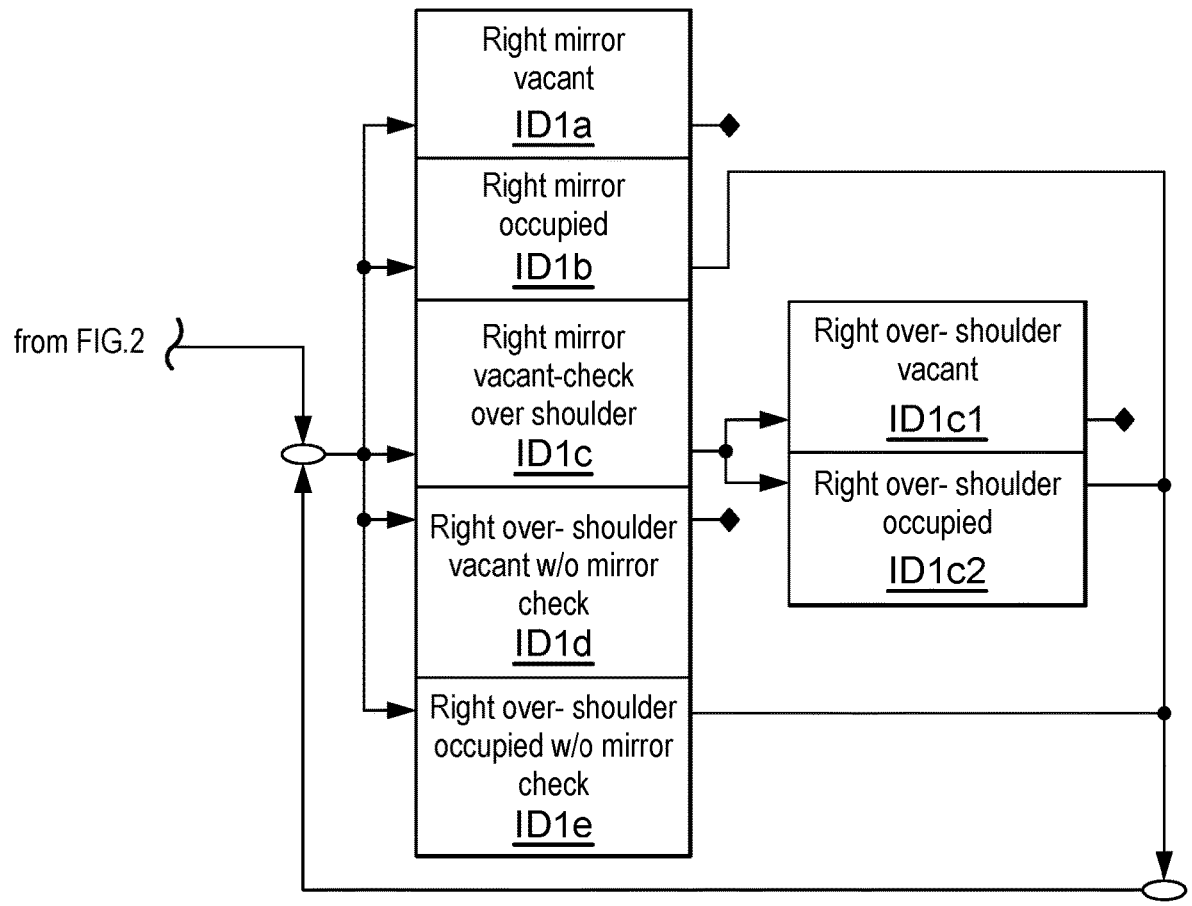
Figure 2:
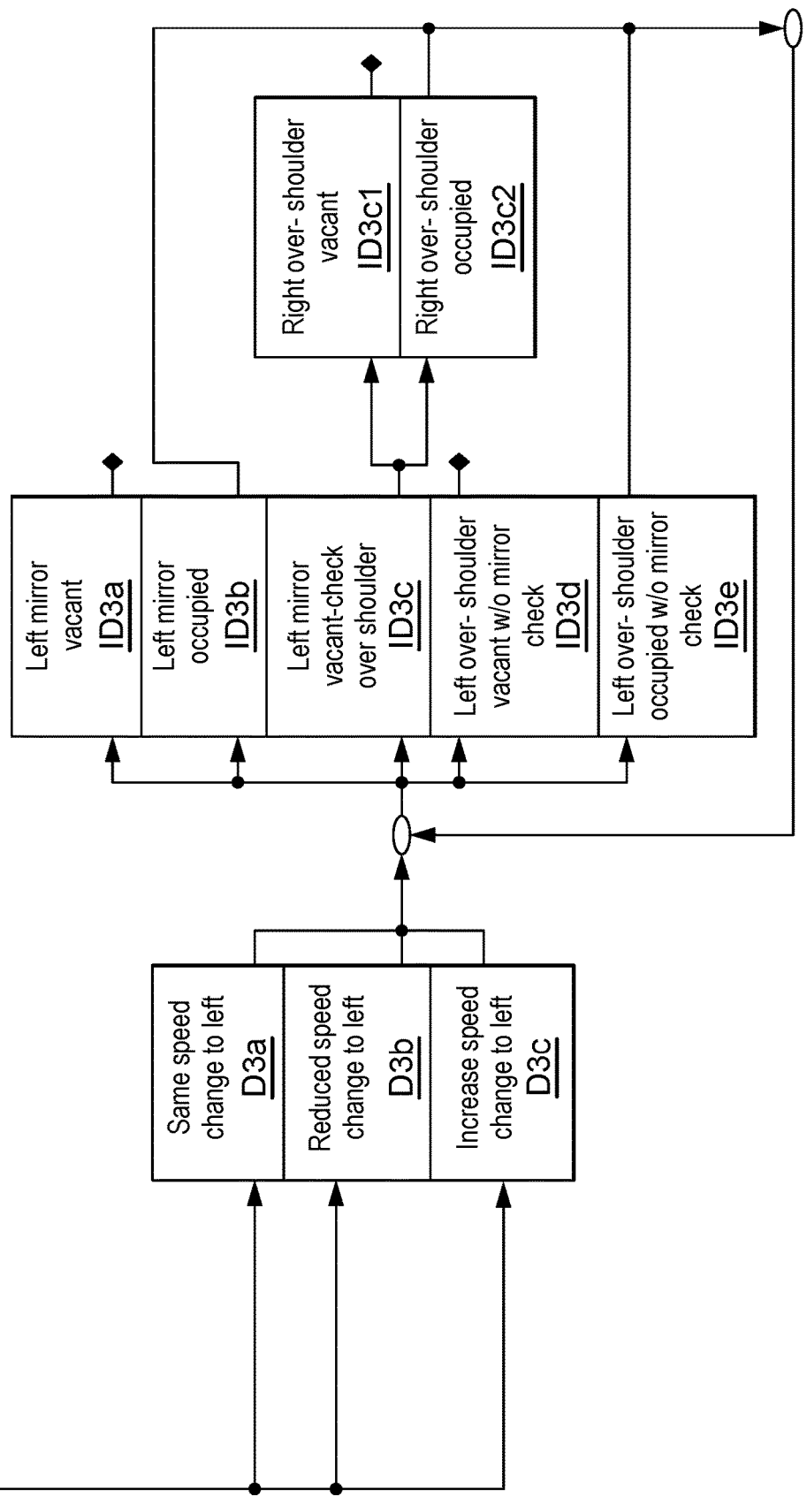

FIG. 2 shows a further representation of method steps which are described with the aid of a cognitive model of a vehicle driver during a take-over of the vehicle guidance from an automated driving mode. FIG. 2 describes a detailed structure of a cognitive model.

P1a describes a starting situation, in particular, the execution of a non-driving-related task by the vehicle driver. Furthermore, P1b describes a motor reaction of the driver, for example the gripping of the vehicle steering wheel. P1c describes the take-over of the driving task. Thereafter, P1d describes a focusing of the vehicle driver on the area spatially ahead of the ego motor vehicle. As was already illustrated with regard to FIG. 1, IR describes possible individual reactions, IRa now describing the execution of a brake application, and IRb describing the execution of an acceleration maneuver. Furthermore, P2 describes the perception of the driving situation spatially ahead of the motor vehicle. P2a describes the perception that no further vehicle is situated ahead of the ego motor vehicle. When no vehicle is situated ahead of the ego motor vehicle, the vehicle driver focuses on the right side of the ego motor vehicle. P3a describes the perception that no vehicle is situated on the right side of the ego motor vehicle. In contrast, P3b describes that a vehicle is perceived there.

P2b describes the perception that a further vehicle is situated ahead of the ego motor vehicle. In this case, P_sum follows as the next step. If, however, the distance between the vehicle and the ego motor vehicle remains the same or increases, the individual decision is made with the aid of P3_ID to also check a lane change to the right. P3a or P3b, as described above, follows.

In the subsequent decision-making process, essentially three decision options are described, as was already explained with respect to FIG. 1: D1 lane change to the right, D2 keeping the present lane, and D3 lane change to the left.

D1a describes a decision option for a lane change to the right. Due to the obligation to drive on the right side of the road, this decision option is checked first. This presupposes, of course, that no vehicle was detected on the right side (R=No) during the perception process with the aid of P3b. As soon as a positive decision in favor of a lane change to the right has been made, this driving maneuver is prepared. For this purpose, the procedure describes three behavioral patterns to ensure that no vehicle is actually situated next to or behind the ego motor vehicle on the target lane. In the process, ID1a, for example, describes a decision that no vehicle is ascertained in the right side mirror. In contrast, ID1b describes the decision that a vehicle is ascertained in the right side mirror. ID1c describes the decision that no vehicle is ascertained in the right side mirror and a look over the shoulder to the right is carried out. ID1c1 describes in the process that no vehicle is ascertained either with the aid of the look over the shoulder to the right. In contrast, ID1c2 describes that a vehicle is ascertained with the aid of the look over the shoulder to the right. ID1d describes the decision that only a look over the shoulder to the right is executed, no vehicle being ascertained with the aid of the look over the shoulder. ID1e describes the decision that only a look over the shoulder to the right is executed, a vehicle being ascertained with the aid of the look over the shoulder. Within this meaning, steps ID1a through ID1e represent alternatives. However, it must be noted that this decision-making step may also be run through multiple times. If a vehicle is identified on the target lane in the process, the decision is aborted, and an alternative decision option is checked. If no vehicle is identified on the target lane in the process, the decision is confirmed, and a lane change is executed.

If, however, it is ascertained within the scope of the perception process that no vehicle is situated spatially ahead of the ego motor vehicle, but a vehicle is situated on the right lane (R=Y, F=No), the decision is made with the aid of D2a that the present lane is being kept.

If it is ascertained within the scope of the perception process that a vehicle is situated spatially ahead of the ego motor vehicle, the distance between the two vehicles is analyzed. If the distance remains the same or if the distance increases (F=Y, & D2>=D1), a lane change to the right is checked with the aid of P3_ID (as was already explained above).

If a lane change to the right is possible, this decision option is executed according to D1a.

If a lane change to the right is not possible (i.e., a vehicle was perceived on this lane), the decision is described with the aid of D2b that the present lane is being kept. This, of course, furthermore presupposes that the distance between the ego motor vehicle and the vehicle situated spatially ahead thereof remains the same or increases (R=Y, F=Y & D2>=D1).

ID2a describes an update of the perceived driving situation as well as a check of the decision to keep the present lane. For this purpose, the vehicle driver turns forward again.

If it is established that a vehicle is situated on the right lane, as well as that a vehicle is also situated spatially ahead of the ego motor vehicle, and the distance between the ego motor vehicle and the vehicle situated spatially ahead of the ego motor vehicle decreases (R=Y, F=Y, & D2<D1), the decision option for a lane change to the left is checked with the aid of D3. For this purpose, the approach describes three action options: D3a describes a lane change to the left at the same speed. D3b describes a lane change to the left while reducing the speed. D3c describes a lane change to the left while increasing the speed.

The procedure furthermore describes three behavioral patterns to ensure that no vehicle is actually situated next to or behind the ego motor vehicle on the target lane. In the process, ID3a, for example, describes the decision that no vehicle is ascertained in the left side mirror. In contrast, ID3b describes the decision that a vehicle is ascertained in the left side mirror. ID3c describes the decision that no vehicle is ascertained in the left side mirror and a look over the shoulder to the left is carried out. ID3c1 describes in the process that no vehicle is ascertained even with the aid of the look over the shoulder to the left. In contrast, ID3c2 describes that a vehicle is ascertained with the aid of the look over the shoulder to the left. ID3d describes the decision that only a look over the shoulder to the left is executed, no vehicle being ascertained with the aid of the look over the shoulder. ID3e describes the decision that only a look over the shoulder to the left is executed, a vehicle being ascertained with the aid of the look over the shoulder. Within this meaning, steps ID3a through ID3e represent alternatives. However, it must be noted that this decision-making step may also be run through multiple times. If a vehicle is identified on the target lane in the process, the decision is aborted, and an alternative decision option is checked. If no vehicle is identified on the target lane in the process, the decision is confirmed, and a lane change is executed.

Figure 3:
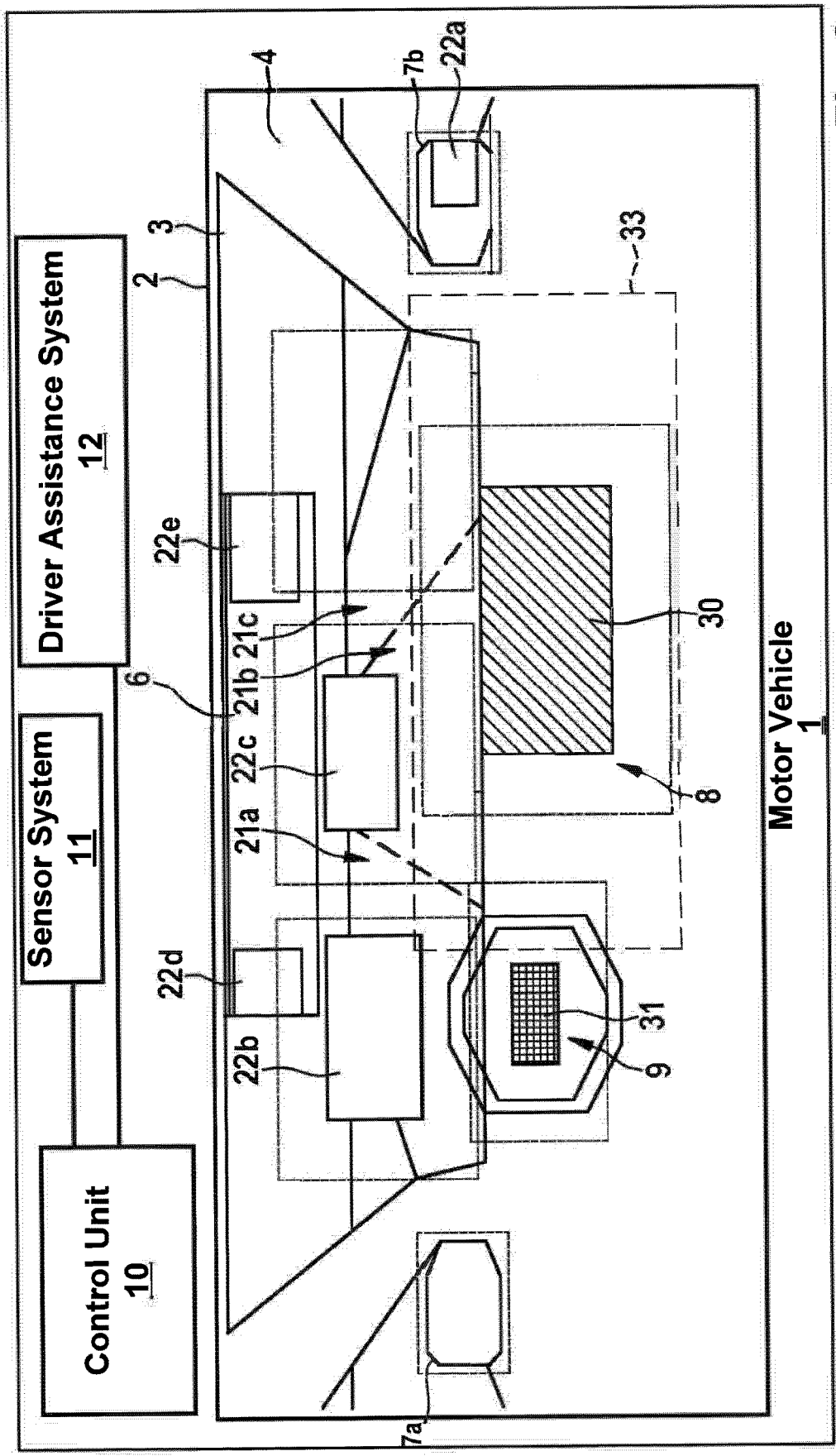
FIG. 3 shows an information structure adapted to the overall field of vision of the vehicle driver with respect to a first driving situation.

FIG. 3 shows an information structure adapted to the overall field of vision of the vehicle driver with respect to a first driving situation. The shown representation may be designed as a graphical user interface for the cognitive model. Such an implementation may take place with the aid of a so-called vision module.

FIG. 3 shows a possible overall field of vision 2 of a vehicle driver of a motor vehicle 1. Overall field of vision 2 encompasses parts of the passenger compartment of motor vehicle 1, for example windshield 3, A pillars 4, rear-view mirror 6, the left and right side windows 7, center console display 8, and instrument display 9. Overall field of vision 2 furthermore encompasses elements of a driving situation, for example the lanes pointing forward spatially with respect to motor vehicle 1, for example left lane 21a, center lane 21b, and right lane 21c, as well as possible road users 22, for example further vehicles, on the lanes.

Furthermore, mirror images of further road users 22a may also be situated in the overall field of vision, for example with the aid of side mirror 7 or rear-view mirror 6. Furthermore, the accordingly relevant areas of interest 33 are identified in the representation. These areas of interest may have different relevances (and thus, for example, different weightings). The SEEV (salience, effort, expectancy, value) theory may be used, for example, for defining the particular relevance.

Motor vehicle 1 furthermore includes a control unit 10, a sensor system 11, for example a camera, as well as a driver assistance system 12, for example a highly automated driving function including a hand-over function of the driving task to the driver in defined driving situations. FIG. 3 shows such a take-over request to the vehicle driver. The vehicle driver is presently busy with a non-driving-related task 30, for example with an interaction with center console display 8. The actual driver field of vision 33 is accordingly focused on this area. In this situation, a take-over request 31 occurs, for example, in combination with a visual indication on the instrument display as well as an acoustic indication.

FIG. 4 shows an information structure adapted to the overall field of vision of the vehicle driver with respect to a second driving situation. Reference is made in this regard, in particular, to the comments regarding FIG. 3. In contrast thereto, the vehicle driver now is not executing a non-driving-related task. The vehicle driver is rather focused on the driving situation situated spatially ahead of him or her. The actual driver field of vision 33 accordingly encompasses the further road users 22 in the lanes ahead of him or her. With the aid of the cognitive model, for example, the perception of the driving situation and/or the decision-making process of the vehicle driver may now be simulated.

What is claimed is:

1. A method for transferring a motor vehicle from an autonomous driving mode, in which the motor vehicle is guided autonomously, into a manual driving mode, in which the motor vehicle is guided by a vehicle driver, the method comprising:
    using a sensor system to sense parameters of a current state of the motor vehicle and of the vehicle driver;
    simulating a predicted driver behavior by applying the sensed parameters to a cognitive model of the vehicle driver, wherein:
        the cognitive model maps, with a plurality of nodes, a hierarchical sequence of a perception by the vehicle driver of a takeover request issued by the vehicle and predefined behavioral alternatives of the vehicle driver for each of a plurality of predefined driving situation alternatives;
        the predefined behavioral alternatives include possible reactions to the takeover request issued by the vehicle and predefined alternative decisions to perform according to a respective action option;
        the mapping of the plurality of nodes by the cognitive model is with a hierarchical organization by which the plurality of nodes are distributed over a plurality of hierarchical levels; and
        for each respective one of a subset of the hierarchical levels, the respective hierarchical level includes a respective plurality of the nodes (a) that represent at least alternative possibilities of the perception and the predefined behavioral alternatives for respective ones of the plurality of predefined driving situation alternatives and (b) at least some of which each branches to a respective further plurality of the nodes that are of a lower one of the hierarchical levels than the respective hierarchical level; and
    performing the transferring of the motor vehicle from the autonomous driving mode into the manual driving mode with a timing that is selected based on a result of the simulation.

2. The method as recited in claim 1, wherein the cognitive model is based on an ACT-R architecture.

3. The method as recited in claim 1, wherein the cognitive model models a plurality of scenarios that are alternatives of one another and that respectively correspond to a plurality of alternative views that are alternatively achievable by the vehicle driver, by eye and head movements, throughout an entirety of a predefined overall field of vision of the vehicle driver.

4. The method as recited in claim 3, wherein the alternative views encompass differently weighted areas.

5. The method as recited in claim 1, wherein the cognitive model differs for different drivers.

6. The method as recited in claim 1, wherein the mapping of the cognitive model includes:
a map node corresponding to a perception, by the vehicle driver, of the takeover request;
a map node corresponding to a perception, by the vehicle driver, of a driving situation in a driving direction ahead of the motor vehicle; and
a map node corresponding to a perception, by the vehicle driver, of a driving situation in a driving direction to a right side of the motor vehicle.

7. The method as recited in claim 1, wherein:
the mapped hierarchical sequence of the cognitive model includes a perception state map node;
the perception map node corresponds to a juncture of other map nodes of the cognitive model that respectively correspond to respective driver's perceptions leading to a state of the driver's perception represented by the perception map node;
the respective driver's perceptions include the alternative possibilities of the perception by the vehicle driver of the takeover request; and
the perception map node transitions, in the cognitive model, to decision map nodes that represent a plurality of the predefined alternative decisions.

8. The method as recited in claim 1, wherein the mapping of the cognitive model includes:
a map node corresponding to a decision evaluation of the vehicle driver for a lane change to a right lane;
a map node corresponding to a decision evaluation of the vehicle driver for keeping a present lane; and
a map node corresponding to a decision evaluation of the vehicle driver for a lane change to a left lane.

9. A device configured for transferring a motor vehicle from an autonomous driving mode, in which the motor vehicle is guided autonomously, into a manual driving mode, in which the motor vehicle is guided by a vehicle driver, the device comprising:
a processor having an interface to a vehicle sensor system and to a vehicle driving assistance system, wherein the processor is configured to:
use the sensor system to sense parameters of a current state of the motor vehicle and of the vehicle driver;
simulate a predicted driver behavior by applying the sensed parameters to a cognitive model of the vehicle driver, wherein:
the cognitive model maps, with a plurality of nodes, a hierarchical sequence of a perception by the vehicle driver of a takeover request issued by the vehicle and predefined behavioral alternatives of the vehicle driver for each of a plurality of predefined driving situation alternatives;
the predefined behavioral alternatives includes possible reactions to the takeover request issued by the vehicle and predefined alternative decisions to perform according to a respective action option;
the mapping of the plurality of nodes by the cognitive model is with a hierarchical organization by which the plurality of nodes are distributed over a plurality of hierarchical levels; and
for each respective one of a subset of the hierarchical levels, the respective hierarchical level includes a respective plurality of the nodes (a) that represent at least alternative possibilities of the perception and the predefined behavioral alternatives for respective ones of the plurality of predefined driving situation alternatives and (b) at least some of which each branches to a respective further plurality of the nodes that are of a lower one of the hierarchical levels than the respective hierarchical level; and
control the driver assistance system to perform the transferring of the motor vehicle from the autonomous driving mode into the manual driving mode with a timing that is selected based on a result of the simulation.

10. A non-transitory machine-readable memory medium on which is stored a computer program for that is executable by a processor and that, when executed by the processor, causes the processor to perform a method for transferring a motor vehicle from an autonomous driving mode, in which the motor vehicle is guided autonomously, into a manual driving mode, in which the motor vehicle is guided by a vehicle driver, the method comprising:
using a sensor system to sense parameters of a current state of the motor vehicle and of the vehicle driver;
simulating a predicted driver behavior by applying the sensed parameters to a cognitive model of the vehicle driver, wherein:
the cognitive model maps, with a plurality of nodes, a hierarchical sequence of a perception by the vehicle driver of a takeover request issued by the vehicle and predefined behavioral alternatives of the vehicle driver for each of a plurality of predefined driving situation alternatives;
the predefined behavioral alternatives include possible reactions to the takeover request issued by the vehicle and predefined alternative decisions to perform according to a respective action option;
the mapping of the plurality of nodes by the cognitive model is with a hierarchical organization by which the plurality of nodes are distributed over a plurality of hierarchical levels; and
for each respective one of a subset of the hierarchical levels, the respective hierarchical level includes a respective plurality of the nodes (a) that represent at least alternative possibilities of the perception and the predefined behavioral alternatives for respective ones of the plurality of predefined driving situation alternatives and (b) at least some of which each branches to a respective further plurality of the nodes that are of a lower one of the hierarchical levels than the respective hierarchical level; and
performing the transferring of the motor vehicle from the autonomous driving mode into the manual driving mode with a timing that is selected based on a result of the simulation.

* * * * *